United States Patent
Tresser et al.

(10) Patent No.: US 9,110,557 B2
(45) Date of Patent: Aug. 18, 2015

(54) SYSTEM AND METHOD FOR TRACKING AND MAPPING AN OBJECT TO A TARGET

(75) Inventors: Sarit Tresser, Haifa (IL); Shay Yagur, Tel Aviv (IL); Gil Wohlstadter, Givatayim (IL)

(73) Assignee: Timocco Ltd., Tel-Aviv (IL)

( * ) Notice: Subject to any disclaimer, the term of this patent is extended or adjusted under 35 U.S.C. 154(b) by 232 days.

(21) Appl. No.: 13/696,287

(22) PCT Filed: May 3, 2011

(86) PCT No.: PCT/IL2011/000350
§ 371 (c)(1),
(2), (4) Date: Mar. 22, 2013

(87) PCT Pub. No.: WO2011/138775
PCT Pub. Date: Nov. 10, 2011

(65) Prior Publication Data
US 2013/0190093 A1 Jul. 25, 2013

Related U.S. Application Data

(60) Provisional application No. 61/330,904, filed on May 4, 2010.

(51) Int. Cl.
*H04N 13/02* (2006.01)
*G06F 3/0481* (2013.01)
(Continued)

(52) U.S. Cl.
CPC .............. *G06F 3/0481* (2013.01); *A63F 13/04* (2013.01); *G06F 3/011* (2013.01); *G06F 3/017* (2013.01); *G06F 3/0304* (2013.01)

(58) Field of Classification Search
CPC ................ G06K 9/00335; G06T 13/20; A63F 2300/6045; A63F 2300/6081; A63F 13/00
See application file for complete search history.

(56) References Cited

U.S. PATENT DOCUMENTS 5,423,554 A * 6/1995 Davis ................................. 463/4
5,429,140 A * 7/1995 Burdea et al. ................. 600/587
(Continued)

FOREIGN PATENT DOCUMENTS

CN 101751119 6/2010
EP 1655659 5/2006
(Continued)

OTHER PUBLICATIONS

Communication from a foreign patent office in a counterpart foreign application, date of search was Aug. 17, 2011 from the Great Britain patent office—1 page.
(Continued)

*Primary Examiner* — James S McClellan
*Assistant Examiner* — Kevin Carter
(74) *Attorney, Agent, or Firm* — Roach Brown McCarthy & Gruber, P.C.; Kevin D. McCarthy

(57) ABSTRACT

A method and system for a user interactive game capable of training and monitoring motor and cognitive skills of a patient, is provided. The method includes obtaining an image of an object being manipulated by the user, said image having an image frame; within the image frame, defining a shape of a field of movement; adding a bounding rectangle to the shape of the field of movement; mapping a coordinate from within the object to the bounding rectangle; mapping the coordinate from the bounding rectangle to the image frame; mapping the coordinate from the image frame to the target; and displaying the coordinate on the a computer monitor as an icon.

20 Claims, 4 Drawing Sheets

(51) Int. Cl.
*G06F 3/01* (2006.01)
*G06F 3/03* (2006.01)
*A63F 13/219* (2014.01)

(56) References Cited

U.S. PATENT DOCUMENTS

| | | | |
|---|---|---|---|
| 5,764,786 | A | 6/1998 | Kuwashima et al. |
| 2002/0140708 | A1 | 10/2002 | Sauer |
| 2006/0211462 | A1 | 9/2006 | French et al. |
| 2007/0117625 | A1* | 5/2007 | Marks et al. .................. 463/30 |
| 2007/0126696 | A1* | 6/2007 | Boillot ......................... 345/156 |
| 2008/0100825 | A1 | 5/2008 | Zalewski |
| 2008/0219502 | A1* | 9/2008 | Shamaie ...................... 382/103 |
| 2009/0116692 | A1 | 5/2009 | Paul et al. |
| 2010/0225580 | A1 | 9/2010 | Yoon et al. |
| 2011/0193939 | A1* | 8/2011 | Vassigh et al. ................ 348/46 |
| 2012/0157263 | A1* | 6/2012 | Sivak et al. ..................... 482/4 |

FOREIGN PATENT DOCUMENTS

| | | |
|---|---|---|
| JP | 2011/031886 | 2/2011 |
| WO | 00/56215 | 9/2000 |

OTHER PUBLICATIONS

Communication from a foreign patent office in a counterpart foreign application, date of search was Jul. 31, 2012 from the Great Britain patent office—2 page.

Communication from a foreign patent office in a counterpart foreign application, mailed Sep. 22, 2011—the international search report—1 page.

* cited by examiner

SYSTEM AND METHOD FOR TRACKING AND MAPPING AN OBJECT TO A TARGET

CROSS-REFERENCE TO RELATED APPLICATIONS

This application is a U.S. National Phase Application under 35 U.S.C. 371 of PCT International Application No. PCT/IL2011/000350, which has an international filing date of May 3, 2011, and which claims the benefit of priority of U.S. Provisional Patent Application No. 61/330,904, filed on May 4, 2010, which is incorporated herein by reference in its entirety.

FIELD OF THE INVENTION

The invention relates to the field of tracking and mapping objects to a target, such as computer vision based tracking and mapping of objects. In one embodiment, the invention relates to a system and method for tracking and mapping body or body part movements, adapted to deal with unique ranges of motion.

BACKGROUND OF THE INVENTION

Computer vision based tracking systems are currently used in various applications such as, gesture controlled man machine interfaces, security systems and video game consoles. Different sensors may be used to track moving objects.

A typical body tracking system tracks certain body features (or markers attached to the body) using a camera and processor. The camera obtains images of the body and the processor derives the position of the body feature from the images. The camera generated image frame is then associated with a target, typically a display which may be associated with a computer. For example, in a computer vision based system for controlling a device through human gestures a camera is used to obtain images of a user and track movement of the user's hands, for example, and translates the user's hand movements to control the device, for example, to activate icons on a computer's desktop.

Camera image frames, as well as targets, such as computer displays are typically rectangular. But often the range of natural human limb movement is not rectangular. For example, when a person is standing and moving his arms, the movement range or field of movement possible for the person's arms is an area similar to a circle or ellipse. Thus, a person may not easily reach all the spots of a rectangular target (e.g. if a person can easily reach the top of a rectangular frame using his arms, he will have difficulties reaching the corners of that frame). In other words, a person stretching his arm to the limit of his field of movement may not be able to reach the limit of a target. The same may be true for animal or robotic machine movement. Thus, the association or alignment of an image frame with a target may result in less than accurate positioning of tracked objects (such as a user's hand) on the target since this alignment does not account for the difference between the shape of the field of movement of the object and the shape of the target.

Images can be processed to change their size or shape. Complex algorithms are typically used for such image transformations since adjacent pixels must be considered when changing the size or shape of an image and interpolation is often used, which may reduce overall image definition and which involves high computing power.

To date there is no simple method for accurately translating the relative position of an object in a certain shaped field of movement to a differently shaped target. Such a method is especially missing in the field of interactive computer games.

SUMMARY OF THE INVENTION

Embodiments of the present invention provide a system and method for mapping tracked objects to a target, to enable a user to access and/or control the target in a more natural and easy way.

The system and method according to one embodiment may be applied in an interactive user interface, such as in a computer game in which the user controls objects on a computer screen by moving body parts such as, hands, legs or face.

In a case where a user does not have a full range of motion as a result of a certain disability, (e.g. use of a wheel chair, spastic cerebral palsy or other motor or cognitive disabilities), or just because one prefers to sit down while playing or doesn't have enough space to play in, embodiments of the current invention provide an adaptation of the tracking technology to the specific needs of the user and to a changing environment.

According to one embodiment there is provided a method for tracking and mapping an object to a target, the method comprising the steps of: obtaining an image of said object, said image having an image frame; within the image frame, defining a shape of a field of movement; adding a bounding rectangle to the shape of the field of movement; mapping a coordinate from within the object to the bounding rectangle; mapping the coordinate from the bounding rectangle to the image frame; mapping the coordinate from the image frame to the target; and displaying the coordinate on the target.

According to one embodiment the target is a monitor, such as a computer monitor. Displaying the coordinate on the target may consist of displaying an icon which represents the coordinate, on the monitor.

In one case the shape of the field of movement is an ellipse. In other cases the shape of the field of movement is a rounded rectangle. The image frame is usually a rectangle. Typically, the image frame and the target are of the same shape.

In some embodiments the object is a colored object configured to be manipulated by a user. In some cases a plurality of objects are used and the step of mapping a coordinate from with the object includes mapping a coordinate from within each of the plurality of objects.

According to some embodiments of the invention there is provided a system for tracking an object. According to one embodiment the system includes a sensor to detect the object within a frame; a monitor; and a processor to track the object and to map a coordinate from the object to the monitor, by mapping a coordinate from the object to a bounding rectangle, mapping the coordinate from the bounding rectangle to the frame, and mapping the coordinate from the frame to the monitor.

According to one embodiment the sensor is an image sensor. The image sensor, which may be integral to the monitor, may communicate wirelessly with the processor.

According to one embodiment the object is a colored object that is meant to be manipulated (such as moved) by a user. According to one embodiment the object is a colored sphere glove configured such that a user may slip his hand into it.

According to one embodiment the system includes a processor to process patient performance and to display on the monitor patient performance related information. In one embodiment the patient performance related information includes a presentation of a patient's hand trajectory.

According to one embodiment the system includes a module on which to run a user interactive game in which the coordinate mapped to the monitor is represented by an icon on the monitor. The system may include a processor to control movement of the icon on the monitor in accordance with the tracked object. The user may thus interact with the system by moving an object with his hands and causing movement of corresponding icons on the monitor.

In one embodiment the system includes a processor to detect when two icons are positioned at a predetermined location on the monitor and to start or resume the game only when the two icons are positioned at the predetermined location for a pre-determined time.

BRIEF DESCRIPTION OF THE FIGURES

The invention will now be described in relation to certain examples and embodiments with reference to the following illustrative figures so that it may be more fully understood. In the drawings.

DETAILED DESCRIPTION OF THE INVENTION

The method according to embodiments of the invention can be applied to any tracking system in which the field of movement shape and/or size does not correspond to the target shape and/or size.

According to one embodiment the system and method are used in a computer game which focuses on different motor skills of a patient user, such as the user's posture, bilateral coordination, cross-midline maturation, eye-hand coordination and visual discrimination. The game may also focus on cognitive skills such as attention span, working with sequences, learning numbers, language skills, and more. The computer game may also assist a therapist user, such as a physical or occupational therapist.

Figure 1A:
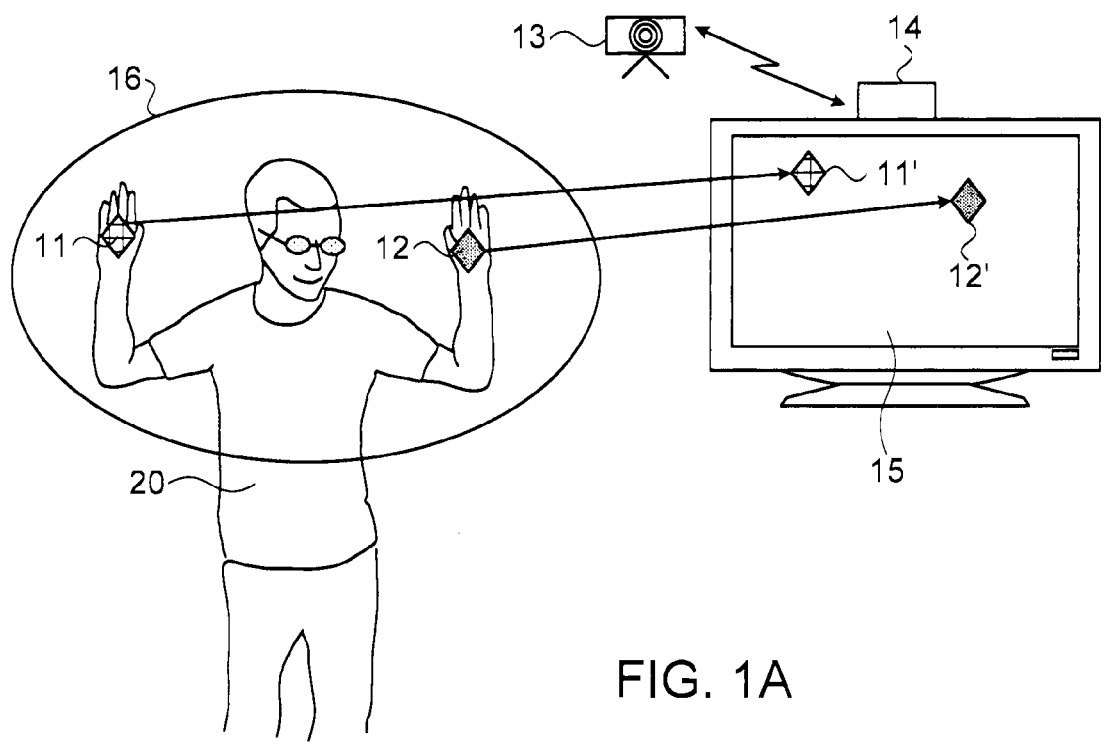
FIGS. 1A-C schematically illustrate a system and system components operable according to an embodiment of the invention.

According to this exemplary embodiment, which is schematically illustrated in FIG. 1A, a user's (20) hand(s) or objects (11 and 12) held by the user (20) can be moved in an essentially elliptically shaped field of movement (16). The user's hands or objects (11 and 12) are imaged by an image sensor (13) and their movement is tracked and mapped by processor (14) to corresponding coordinates (11' and 12') on the computer screen (15).

The objects (11 and 12) may be tracked using any suitable tracking method. For example, a group of pixels within the object may be identified and this group of pixels may be tracked. DSP (digital signal processing) methods or other known tracking methods may be used.

The processor (14) and/or the image sensor (13) can be an integral part of the computer or separate units. For example, the image sensor may be integral to the computer monitor (such as a webcam usually sold with a laptop computer). Alternatively, the image sensor may be connected to the computer monitor or at another location on the computer. The processor (14) may communicate with the image sensor (13) and/or computer by a wired or wireless connection.

In this embodiment an image sensor (13) is used however any sensor suitable for tracking objects may be used, such as a magnetic field detector for tracking magnetic objects, an IR detector, a Bluetooth, cellular or other wireless detector and so on.

According to one embodiment the objects 11 and 12 are differently colored sphere gloves into which a user may slip his hand and which may be imaged by a webcam or other imager.

According to one embodiment one object is meant to be worn or held by the user's right hand and another of the objects is meant to be worn or held by the user's left hand.

According to other embodiments the objects 11 and 12 need not be colored and may include a transmitter configured to be in communication with a sensor.

A single object or a plurality of objects may be used. Alternatively, a user's body or body parts may be detected and tracked directly by a sensor, without the use of objects.

The coordinates (11' and 12') may be used to control the computer mouse or may control on-screen movement of icons or buttons or game gadgets and the like. For example, icons corresponding to the coordinates (11' and 12') may be part of a game and may appear on a graphical background. In one example, the coordinates (11' and 12') may be represented by icons of bananas and the graphical background may include a monkey. The user gets points for feeding bananas to the monkey. Thus, a user (typically a patient user) may be encouraged to perform specific hand movements, based on the monkey's position on the screen (15).

Embodiments of the invention provide a game meant for practicing and improving a variety of motor and cognitive abilities. Such a game may be implemented on a device comprising a media suitable for storing electronic instructions (such as a Local Disk, Network Disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards) and which is capable of being coupled to a computer system.

The system may include a plurality of user interfaces; some meant for a patient user and some meant for a therapist user.

Figure 1B:
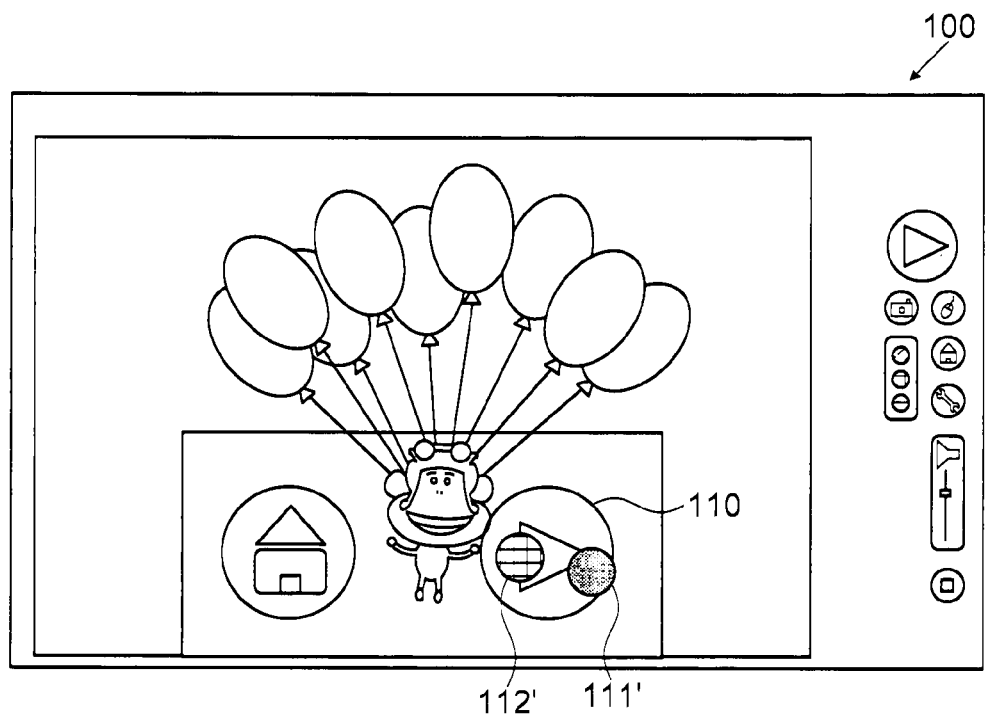

A user interface according to one embodiment is schematically illustrated in FIG. 1B. According to one embodiment of the invention a special graphic user interface (GUI)(100) is used for starting or continuing a game that has been stopped in the middle. The GUI (100) includes, among other typically standard icons, a "play" icon (110) for starting or continuing a game. The play icon (110) is activated by positioning on it one or more user controlled coordinates (such as 11' and 12'). The user controlled coordinates are typically represented by icons (111' and 112'). The user is required to position his hands such that they correspond to the location of the play icon (110) on the computer monitor thereby bringing icons (111') and (112') to stand on or in the vicinity of the play icon (110). The play icon (110) will be activated after a pre-determined period of having icons (111') and (112') located on or near it.

Thus, according to one embodiment of the invention, there is provided a method for initiating or resuming a game or other computer run program, the method including the step of starting the game or other program only if one or more user controlled coordinates represented by user controlled icons are positioned on or in the vicinity of a "play icon" for a predetermined period of time. This somewhat complex procedure is useful in preventing unintentional activation of a game or other program and is instrumental in focusing the user and training him in motor and cognitive activities such as bringing both hands to a specific location and holding them still for a pre-determined period.

Figure 1C:
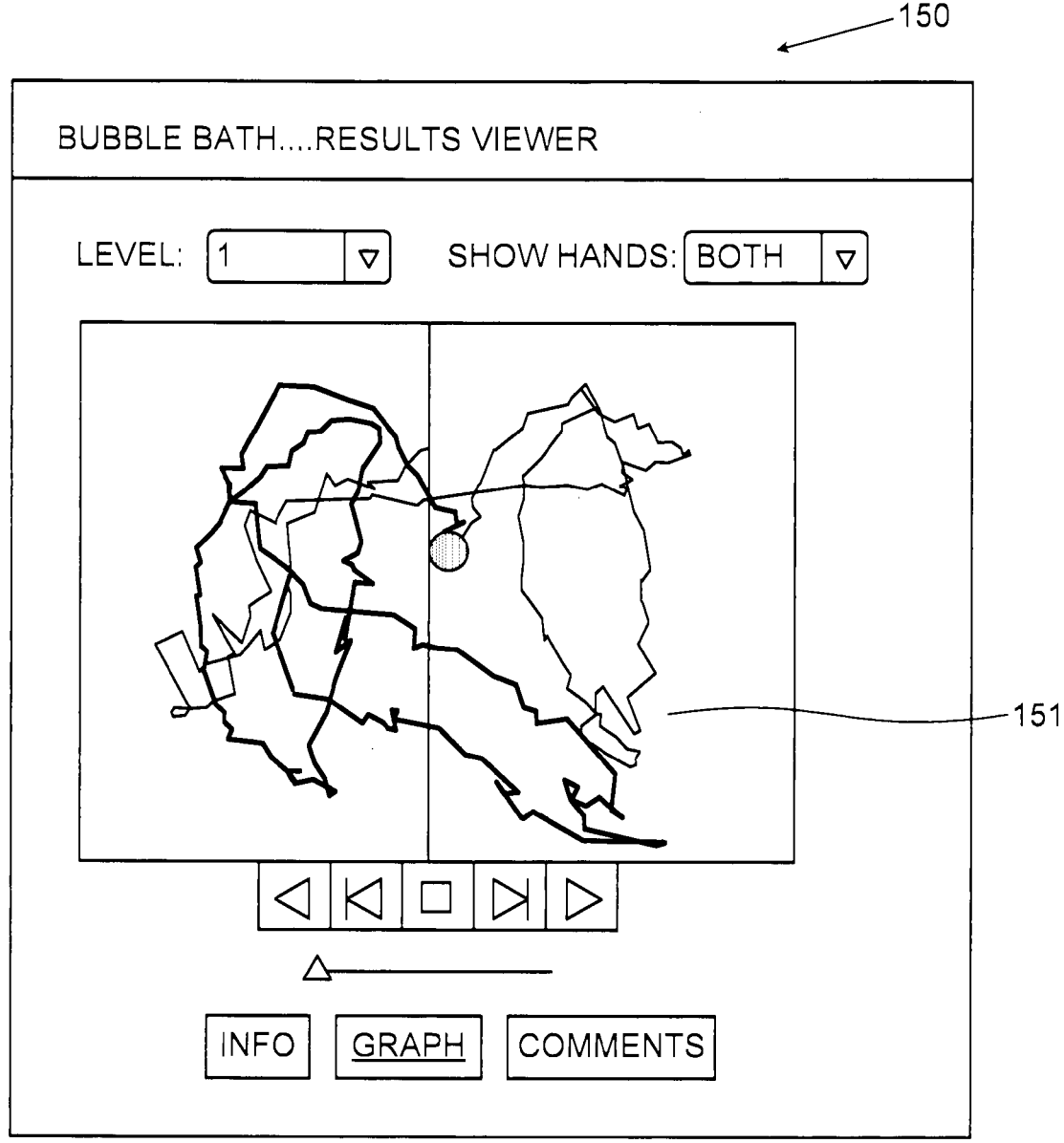

A user interface according to another embodiment of the invention is schematically illustrated in FIG. 1C. The GUI (150) is typically meant for a therapist user. This GUI (150) presents to the therapist information regarding the performance of the patient user. The patient's performance may be recorded and saved in an appropriate module of the computer and the saved information may be processed by a processor of the computer to produce patient performance related information, such as the amount of correct moves, wrong moves, average response time, efficiency. The patient performance related information can be presented to the therapist in the form of a table, windows or in another suitable way. According to one embodiment the trajectory of the patient's hands movement throughout a session may be recorded and presented to the therapist as a graph (151) or in another suitable representation. The patient's hands' location can be presented at any specified point in time or shown as continuous path (such as in the graph (151)) or may be shown progressively, as a movie. The performance related information may be presented in a hand specific way (e.g., only the left hand or only the right hand). The patient's progress may thus be followed and monitored.

Figure 2A:
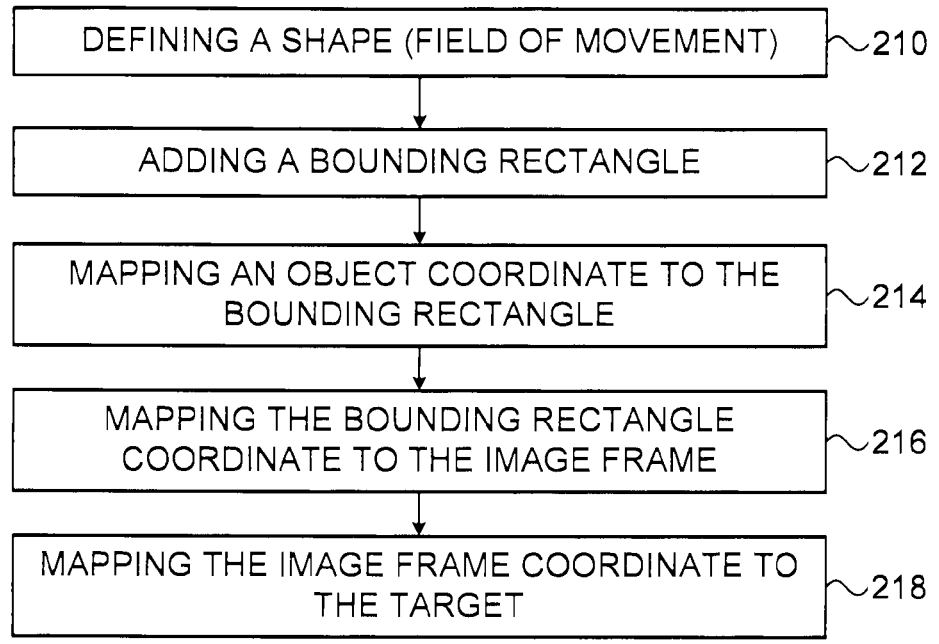
FIG. 2A is a flowchart schematically depicting a method for mapping an object to a computer monitor according to one embodiment of the invention.
Figure 2B:
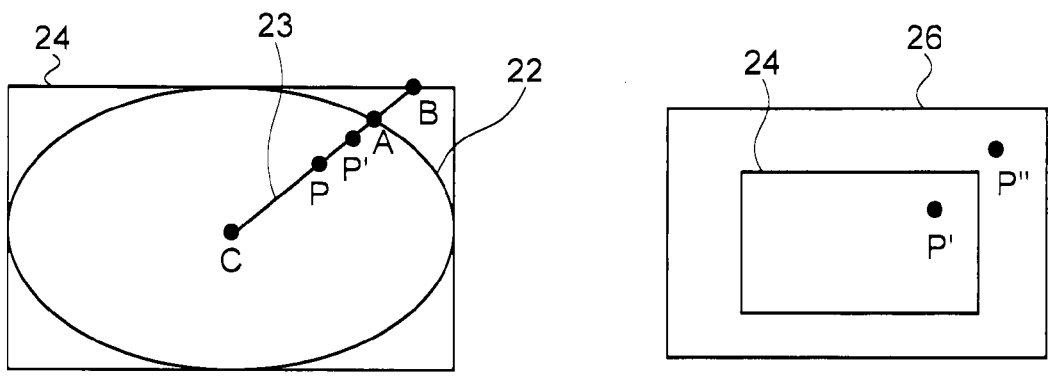
FIG. 2B is a schematic illustration of the method depicted in FIG. 2A.

Reference is now made to FIG. 2A, which shows a flowchart schematically depicting a method for mapping a tracked object to a target, according to an embodiment of the invention. FIG. 2B is a schematic illustrating the concepts of the method depicted in FIG. 2A.

The method includes mapping points or pixels representing the user's body parts or objects moved by the user, to a computer screen. According to one embodiment the mapping is assisted by geometrical shapes, e.g. ellipse or rounded rectangle. The choice of a shape is dependent on the shape of the field of movement of the user.

According to one embodiment an object (e.g., a part of a user's body or an object manipulated by a user), is tracked, typically by obtaining images of the user. The method, according to one embodiment includes the following steps: on an image frame (typically the image includes a user's body) defining a shape (and size of shape) (step 210) (for example, the shape may be of a desired or expected or estimated field of movement) and adding a bounding rectangle to the shape (step 212). Coordinates or pixels (which correspond to a tracked object) from within the defined shape are then mapped in two stages: 1. mapping the object coordinate to the bounding rectangle (step 214); and 2. mapping the resulting bounding rectangle coordinate to the image frame (step 216). From the image frame the coordinate is mapped to the target (step 218).

The defined shape can also be applied in various sizes, to create, for example, a zoom-in effect, and use only a part of the image frame such that partial or small areas of a user's body may be focused on. This way the system may be adapted to handicapped people or to environments in which there is only a limited range of movement.

It should be appreciated that a field of movement may be any shape that approximates the user's range of movement. So, for example, when a user is standing in front of a camera, and the system is tracking either his hands or objects held in his hands, the natural movement area may be similar to a circle in shape. This is because the user's chest can be viewed as the center of the circle, and his two arms act as radiuses around this center. Therefore the user's hands can cover a circular shape. Since both arms do not share the same center, the whole shape can sometimes be better approximated using an ellipse (see for example FIG. 1).

In an attempt to characterize shapes relevant to the present invention, the inventors performed tests in order to define the natural range of motion of human hands' movement. It was recognized that in most cases the proportion between upper limb and trunk creates an ellipse shaped range of motion. Therefore the examples below will relate to an ellipse (the circle is a private case of an ellipse where both radiuses are the same), but the invention can be similarly applied to other shapes.

In FIG. 2B the point P designates a location of a tracked object (e.g., a user's hand or a colored sphere glove held by the user) within the user's field of movement (ellipse 22). P' designate the transformed location of P in relation to the bounding rectangle (rectangle 24). P" designates the transformed location of P in relation to the image frame (26), in a case where the object is being tracked using an image sensor. The coordinates of P" on the final target (e.g. computer monitor or other display) can then be easily calculated, using, for example, triangulation.

Mapping from an ellipse (22) to its bounding rectangle (24) (step 214) may be done by first mapping point P in the ellipse (22) to point P' in the bounding rectangle (24), for example, by passing a line (23) from the center of the ellipse (point C), through point P and continuing the line until the bounding rectangle border (the intersection of the line and the bounding rectangle border is point B and the intersection of the line with the ellipse border is point A), thus defining segments CA and CB. The point P is mapped to point P', where length(CP')/length(CB) is equal to length(CP)/length(CA), i.e. the distance of P relative to the segment CA, should be the same as the distance of P' relative to the segment CB.

The point A (the intersection between the line and the ellipse border) may be calculated by solving 2 equations: the equation of the ellipse (22), and the equation of the line (23).

Mapping from the bounding rectangle (24) to the image frame (step 216) is done by mapping point P' in the bounding rectangle to point P" in the image frame (26) in the following way: calculating the relative X and Y position of P' in the bounding rectangle (24) (e.g.,. where P' is in % along the horizontal and vertical axis respectively of the bounding rectangle) and placing P" in the same relative location, in respect to the image frame (26) For example, if P' is located at 75% on X from the left corner of the bounding rectangle (24), and 80% on Y from the bottom corner of the bounding rectangle (24), then P" will be located at the same relative position in the image frame (26). Determining the location of P" on a target (in a case where transformation from an image frame to another target such as a computer display, is needed) can be calculated in a similar way.

Note: This does not require that the 2 rectangles (e.g., the image frame and the target) will have the same aspect ratio. This method enables to map any rectangular sub section to any other rectangle.

Figure 3:
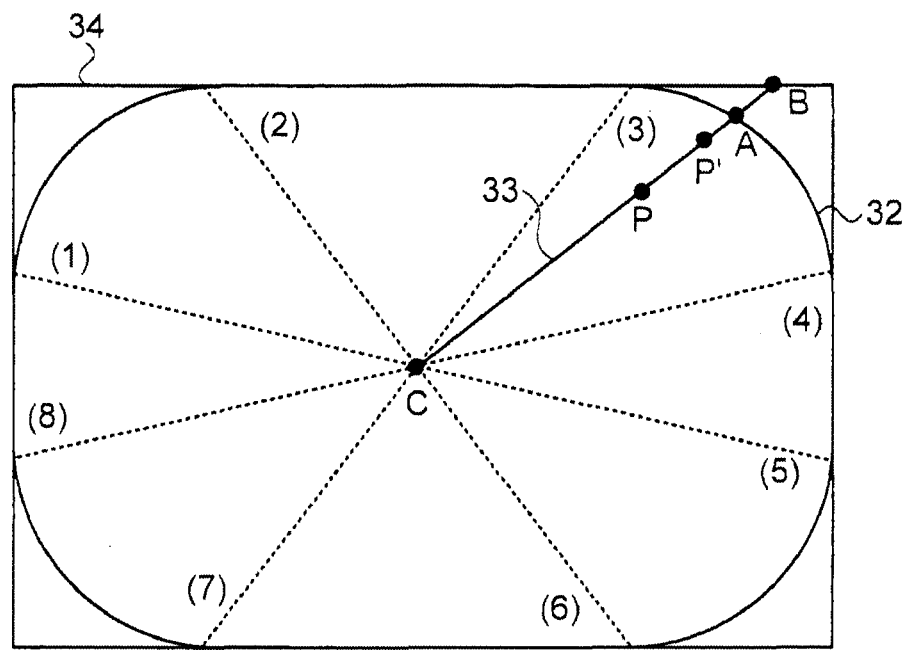
FIG. 3 schematically illustrates the "rounded rectangle" method for mapping an object according to embodiments of the invention.

Reference is now made to FIG. 3 which schematically illustrates another method of tracking and mapping according to embodiments of the invention.

As mentioned above, in most cases an ellipse shaped range of motion has been observed, but since the proportion of hands-body vary somewhat between different people, another method of mapping may be also useful.

According to one embodiment of the invention a "rounded rectangle" shape (32) is used to accommodate for the variance between people by allowing a twist at the edges of the defined field of movement, and therefore enable an adaptation to each person and his/her specific characteristics.

The rounded rectangle is formed by taking a rectangle, and replacing the corners with a quarter of an ellipse.

It should be realized that the method of mapping according to embodiments of the invention may cause a distortion to the coordinates. Using a rounded rectangle shape from which to map to a rectangle frame may help to reduce the distortion.

For example, a game or other application may require the user to make an effort to reach the corners of the display frame. The game levels may be adjusted by changing the shape of defined field of movement; if the field of movement is defined as a rounded rectangle, the smaller the rounded part of the rectangle is, the more effort is required from the user.

According to one embodiment a method is provided for mapping from a rounded rectangle to its bounding rectangle. According to this embodiment, and referring to FIG. 3, points in the areas marked with numbers (2),(4),(6),(8) do not go through any transformation in the first stage and stay the same. Points in the areas marked with numbers (1),(3),(5),(7) are mapped in a similar way to the ellipse mapping described with reference to FIG. 2: the point P will be mapped to point P', where: length(CP')/length(CB) should be equal to length (CP)/length(CA), i.e., the distance of P relative to the segment of the line inside the ellipse (CA), will be the same as the distance of P' relative to the whole line (CB).

The point A (the intersection between the line and the ellipse) may be calculated by solving 2 equations: the equation of the ellipse in the corner, and the equation of the line (33).

Mapping from the bounding rectangle to an image frame (34) and/or to a target can be done the same as described above.

Figure 4:
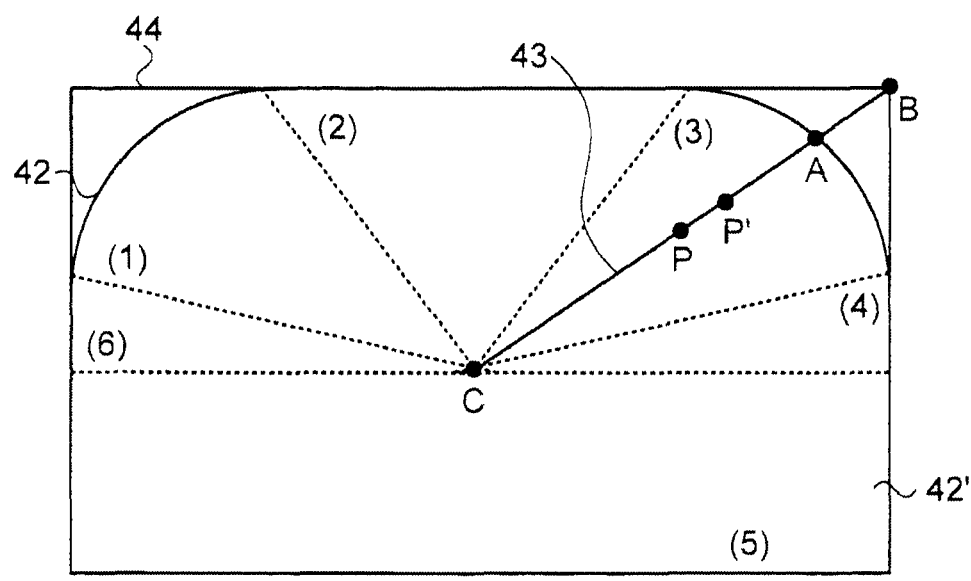
FIG. 4 schematically illustrates the "half rounded rectangle" method for mapping an object, according to embodiments of the invention.

Reference is now made to FIG. 4 which schematically illustrates another method of mapping according to an embodiment of the invention.

In a situation where a user is sitting behind a table or any similar situation (e.g. a user sitting in a wheelchair), the user's natural area of visible movement extends only to the upper part of the frame (in a case where the user's movements are being tracked using an image sensor). In this case a half rounded rectangle, as shown in FIG. 4 might be an appropriate shape to use.

The "half rounded rectangle" mode characterizes a pattern of motion that enables a movement from the waist up. The shape may also contain a narrow rectangle at the bottom, to compensate in case the user can move his hands downwards at least a bit.

The method according to one embodiment, with reference to FIG. 4 includes: mapping from the half rounded rectangle (42) to its bounding rectangle (44): points in the areas marked with numbers (2),(4),(5),(6) do not have any transformation in the first stage and stay the same. Points in the areas marked with numbers (1),(3) are mapped in a similar way to that described above: The point P will be mapped to point P', where: length(CP')/length(CB) should be equal to length (CP)/length(CA), i.e. the distance of P relative to the segment of the line (43) inside the ellipse (CA), will be the same as the distance of P' relative to the whole line (CB).

The point A (the intersection between the line and the ellipse) can be calculated by solving 2 equations: the equation of the ellipse in the corner, and the equation of the line.

Mapping from the bounding rectangle (44) to an image frame and/or to a target can be done as described above.

It should be appreciated that variations can be applied within the boundaries of this invention. For example, other shapes of fields of movement (in various sizes) can be used to better match the natural movement space for a given case (e.g., the half rounded rectangle (42) can be refined so that the bottom rectangle (42') will have slightly rounded corners as well, etc). In another example a defining a field of movement as a small ellipse may enable to control an entire target area by using small movements in the ellipse area.

The examples above enable mapping based on analytic geometry shapes and equations. Alternatively other mapping methods can be used. For example, if the field movement area is characterized by a generic shape given for example as a bitmap mask (for the shape's silhouette), mapping can be done by projecting a ray from the center of the shape (similar to what was demonstrated for the ellipse), and looking for the bitmap pixel on the edge of the shape, which the ray passes through. This method can replace finding the intersection point using analytic geometry.

The invention claimed is:

1. A method comprising:
    tracking limb motion of a user, the tracking comprising obtaining multiple images of the limb each having a rectangular frame;
    determining, based on the tracked limb motion, a range of movement of the limb inside the rectangular frame, the range of movement being elliptical, a rounded rectangle or circular;
    mapping coordinates of a location (P) of the limb in the range of movement to coordinates of a location (P') in a bounding rectangle of the range of movement, by:
        (a) passing a line (CB) from a center (C) of the range of movement, through the location (P) of the limb in the range of movement, until a point (B) on a border of the bounding rectangle, wherein the line (CB) intersects with the range of movement at a point (A),
        (b) setting the coordinates of P' such that P' is on the line (CB) and such that CP'/CB equals CP/CA; and
    mapping the coordinates of P' to target coordinates, and displaying an icon on a computer monitor at the target coordinates.

2. The method according to claim 1, wherein the limb is a hand.

3. The method according to claim 1, wherein the tracking of the limb motion comprises tracking an object worn or held by the limb.

4. The method according to claim 3, wherein the object is a colored object.

5. The method according to claim 4, wherein the colored object is a colored sphere glove.

6. The method according to claim 1, wherein the mapping of the coordinates of P' to the target coordinates comprises:
    mapping the coordinates of P' to coordinates of a location (P'') in the rectangular frame; and
    mapping the coordinates of P'' to the target coordinates.

7. The method according to claim 6, wherein the mapping of the coordinates of P' to the coordinates of P'' comprises:
    calculating a relative X and Y position of P' in the bounding rectangle; and
    placing P'' in a same relative X and Y position with respect to the rectangular frame.

8. The method according to claim 6, wherein the mapping of the coordinates of P'' to the target coordinates comprises:
    calculating a relative X and Y position of P'' in the rectangular frame; and
    setting the target coordinates to a same relative X and Y position with respect to the computer monitor.

9. The method according to claim 1, further comprising requiring the user to make an effort to reach corners of the computer monitor by changing the shape of the field of movement.

10. A system comprising:
an image sensor;
a computer monitor; and
a processor configured for:
(a) tracking limb motion of a user by obtaining, from said image sensor, multiple images of the limb each having a rectangular frame,
(b) determining, based on the tracked limb motion, a range of movement of the limb inside the rectangular frame, the range of movement being elliptical, a rounded rectangle or circular,
(c) mapping coordinates of a location (P) of the limb in the range of movement to coordinates of a location (P') in a bounding rectangle of the range of movement, by:
(i) passing a line (CB) from a center (C) of the range of movement, through the location (P) of the limb in the range of movement, until a point (B) on a border of the bounding rectangle, wherein the line (CB) intersects with the range of movement at a point (A),
(ii) setting the coordinates of P' such that P' is on the line (CB) and such that CP'/CB equals CP/CA, and
(d) mapping the coordinates of P' to target coordinates, and displaying an icon on the computer monitor at the target coordinates.

11. The system according to claim 10, wherein the image sensor is configured to communicate wirelessly with the processor.

12. The system according to claim 10, wherein the image sensor is integral to the monitor.

13. The system according to claim 10, wherein the limb is a hand.

14. The system according to claim 10, wherein the tracking of the limb motion comprises tracking an object worn or held by the limb.

15. The system according to claim 14, wherein the object is a colored object.

16. The system according to claim 15, wherein the colored object is a colored sphere glove.

17. The system according to claim 10, wherein the mapping of the coordinates of P' to the target coordinates comprises:
mapping the coordinates of P' to coordinates of a location (P") in the rectangular frame; and
mapping the coordinates of P" to the target coordinates.

18. The system according to claim 17, wherein the mapping of the coordinates of P' to the coordinates of P" comprises:
calculating a relative X and Y position of P' in the bounding rectangle; and
placing P" in a same relative X and Y position with respect to the rectangular frame.

19. The system according to claim 17, wherein the mapping of the coordinates of P" to the target coordinates comprises:
calculating a relative X and Y position of P" in the rectangular frame; and
setting the target coordinates to a same relative X and Y position with respect to the computer monitor.

20. The system according to claim 10, wherein the processor is further configured for requiring the user to make an effort to reach corners of the computer monitor by changing the shape of the field of movement.

* * * * *